July 17, 1923.

S. YAMADA

TWINE CUTTING DEVICE

Filed June 11, 1921

Shigetaro Yamada
INVENTOR.

BY
Bacon & Thomas
ATTORNEYS

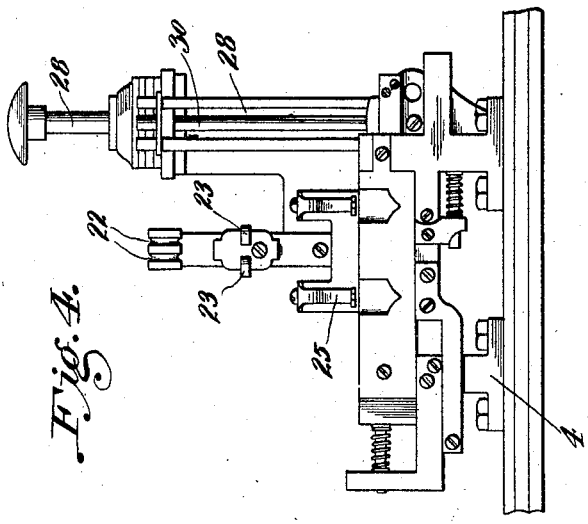
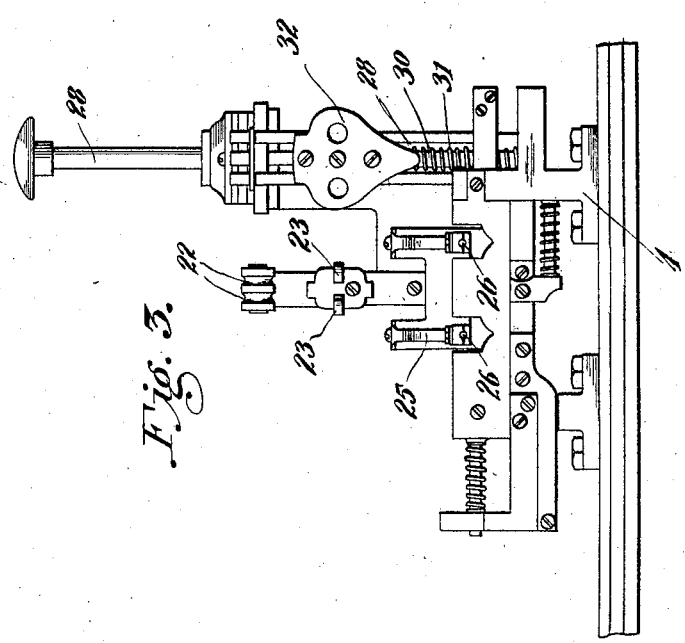

July 17, 1923.

S. YAMADA 1,462,097

TWINE CUTTING DEVICE

Filed June 11, 1921

Shigetaro Yamada
INVENTOR.

BY

Bacon + Thomas
ATTORNEYS

Patented July 17, 1923.

1,462,097

UNITED STATES PATENT OFFICE.

SHIGETARO YAMADA, OF HONOLULU, TERRITORY OF HAWAII.

TWINE-CUTTING DEVICE.

Application filed June 11, 1921. Serial No. 476,786.

*To all whom it may concern:*

Be it known that I, SHIGETARO YAMADA, a subject of the Emperor of Japan, residing at Honolulu, in the county of Honolulu and Territory of Hawaii, U. S. A., have invented certain new and useful Improvements in Twine-Cutting Devices, of which the following is a specification.

The invention relates to improvements in cord or twine cutting devices.

It is an object of the invention to provide a cord or twine cutting machine which is of a simple construction, and one that is capable of general use wherever it is desirable to sever the cord or twine by a machine. The invention has particular application to the provision of a machine wherein a supply of twine or cord in ball form is automatically advanced under a movable cutting blade where the cord or twine is sheared and the end of the cord then slightly advanced, so as to provide a portion to be conveniently grasped for a second operation.

More particularly the invention comprises a portable apparatus which may be placed upon a store counter or the like, having supporting means for a ball or balls of cord or twine, adapted to be fed through the machine. Suitable knives actuated by a manually pressed handle serve to sever the strands, and after severance thereof, the cord is advanced automatically so as to provide exposed end portions which may be grasped for a subsequent use when the cutters are to be again operated. This permits a user to rapidly obtain a strand or strands of cord or twine of a desired length, to instantly sever the same, and to automatically advance the ends of the balls so that said ends are exposed for a subsequent operation.

The invention consists in improved structures and combinations for accomplishing this end, wherein the parts are all arranged in compact formation and are operated upon a single stroke of the knive operating lever.

In the accompanying drawings I have disclosed the preferred embodiment of my invention, but it will be understood that the construction and arrangement of parts may be altered without departing from the spirit of this invention.

In the drawings, Figure 1 represents a view looking at one side of the device.

Figures 3 and 4 are views looking at the front of the apparatus; and,

Figure 1:
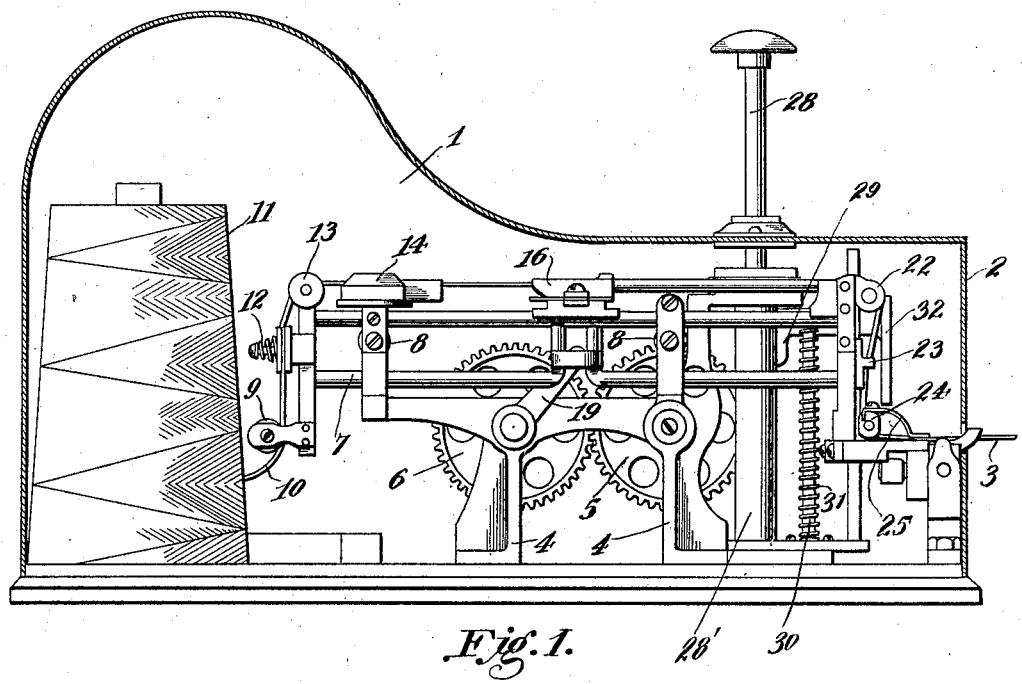
Figure 2:
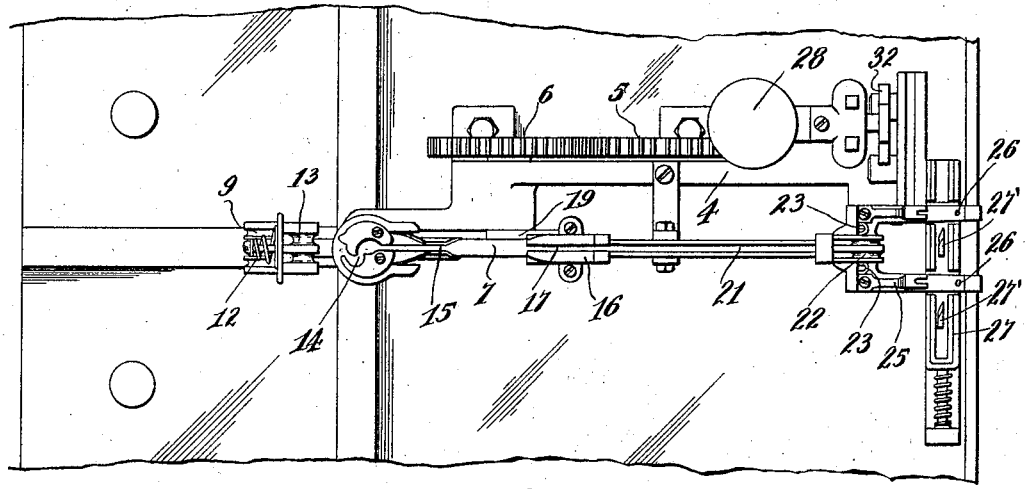
Figure 2 is a top view with the case removed.
Figure 5:
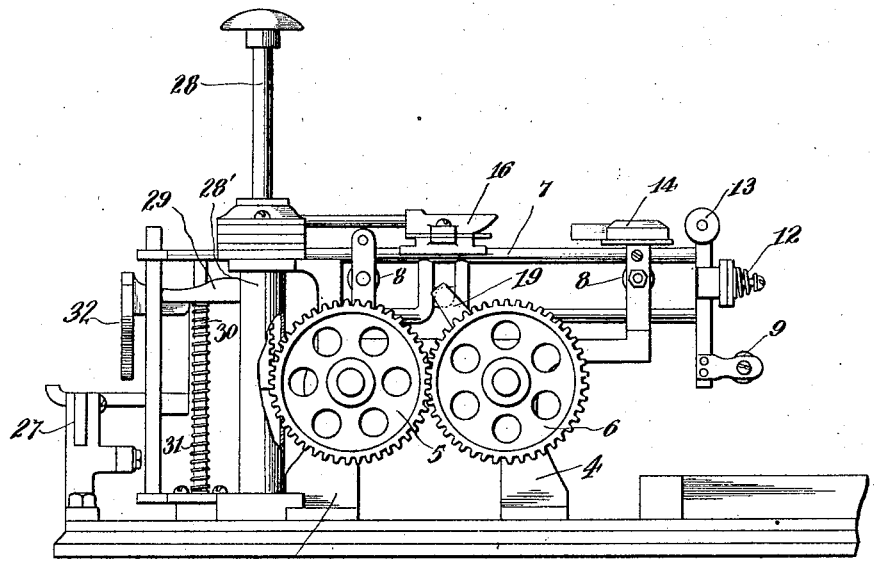
Figures 5 and 6 are detail views.
Figure 6:
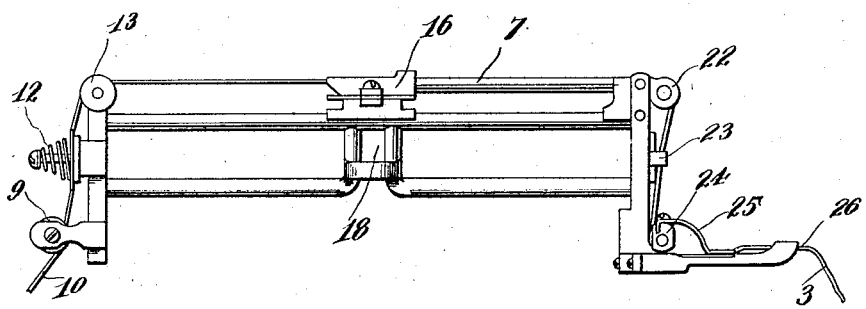

Referring now more particularly to the drawings wherein like reference numerals indicate corresponding parts, the numeral 1 designates a casing adapted to receive the various parts of the cutting and feeding mechanism, which casing may be composed of wood or metal, and conveniently seated upon any desired support. The casing has a door portion 2 at the forward end thereof, through which cord or twine leads 3 pass, the operating mechanism of the device for feeding the cord and severing the same to be more fully hereinafter described.

Mounted within the casing 1 is a base 4, having upstanding parts receiving the meshing gears 5 and 6, journaled in said parts, and also receiving a sliding cord feeding frame 7 movable over antifriction rollers 8 supported by the base 4. The rear end of this frame is provided with pulleys 9 receiving strands of cord or the like 10, leading from the balls 11, surrounding suitable spindles, which cord passes around the pulley 9, then through a tension spring 12 over the pulley 13 and engaged by the string grip 14 having a longitudinal string passage 15 passing therethrough, which passage is of a configuration to permit the string or strings to be moved forwardly through said string grip, but to retard a return movement of the string from the string grip rearwardly in a manner which will be later described. From this grip the string passes on to a second string grip 16 having the longitudinal string receiving opening 17 therein, this string grip being slidably mounted upon the frame 7, while the grip 14, as will be observed, is stationarily mounted upon the frame 4. The reciprocating frame 7 merely consists of separated bars, provided with a vertical space 18 therein, intermediate their ends adapted to receive the crank arm 19 operating off of the shaft of the gear 6, which crank arm effects a forward and rearward motion of the frame during its oscillation, all of which will be more fully hereinafter described.

From the advancing string lead 16, the string passes on through a guideway 21, which is stationarily mounted and adapted to receive the forward end of this string so that said lead when shifted moves relative to the guideway. After passing through the guideway, the string or strings pass around lead pulleys 22 at the forward end of the machine, then in a vertical path through the lead hooks 23, around the lead pulleys 24. From around these pulleys the string passes horizontally under the tension springs 25, then through apertures 26 in the string leads.

Before reaching the apertures in the string leads, the strings are of course caused to pass through apertures in the cutter frame 27, which cutter frame consists of suitable separated side bars mounted upon a support, and having mounted therein cutting knives 27' attached to a cutting bar, which cutting bar at its outer end is fashioned with a crank arm 26ª adapted to be engaged by an operating member to shift the entire cutting frame against the tension of the springs 27ª so that said knives 27' are moved across the path of the strings, engaging and serving said strings, the knives being returned to their normal position by the resilient springs cooperating therewith, and engaging surfaces of a stationary part of the machine.

To actuate the cutters or knives, and likewise feed the strings, there is disposed within the casing a reciprocating push rod 28, mounted within the cylinder 28', and having secured thereto a gear rack meshing with the teeth of the gear 5. This lever is also provided with an offset part 29, having an aperture passing through the standard 30, which offset part causes a depression of the spring 31 when the hand operating rod 28 is depressed, thereby causing said rod to be automatically returned to its normal position when pressure thereon is released. This offset member 29, is also connected by bolts, rivets, or the like, with the knive operating wedge 32, pointed downwardly, and is of such a construction that the curved sides thereof engage the knife operating crank and due to the cam action shifts said crank to actuate the knives and sever the string lying in the path thereof.

It will be observed that due to the gear arrangement 5 and 6, that when the rod 28 is depressed, the knives of course are shifted so as to cut the string or strings lying in the path thereof. During this downward movement of the rod 28, the crank arm 19 is oscillated rearwardly toward the twine balls, which causes a rearward movement of the sliding frame 7, and the advancing string grip 16. However, after the string or strings have been severed by the knives and the coil spring is advancing the rod 28 to its normal or raised position, the gear 6 rotates in a reverse direction, moving the crank arm forwardly, which crank arm of course shifts the movable frame 7 and the string grip 16 forwardly, which advances the string or strings so that the severed ends of the strings are pushed forwardly a sufficient distance until they project through the openings in the string leads 26, whereby they may be grasped by the user of the device when it is again necessary to operate the machine. It will be observed that while the string grip 16 is operable, that the string grip 14 is stationary, and that said grip prevents the string from being moved rearwardly when the grip 16 is being shifted in a rear direction by the crank arm 19. This grip merely slides from the string and when the grip is again caused to travel in a forward direction, it grips the string and advances the same the length of its movement, which is sufficient to push the severed ends out through the string leads 26. From the foregoing it will be apparent that the operation of the hand rod 28 upon its downward stroke causes the wedge-shaped member 32 to engage the crank arm 26ª, causing an actuation of the knives 27' in the path of the string, severing said string. These crank arms are constructed so that one moves in one direction and the other in an opposite direction upon the engagement of the beveled sides of the wedge-shaped member 32 causing an operation of the knives.

Having thus described the invention, what I claim is:

1. A machine of the character described, comprising a base, reciprocating twine feeding means carried thereby, a knife adapted to sever twine interposed in the path thereof, a hand operated rod for actuating said knife, and means operated by said rod for moving the twine feeding means to cause the end portion of the twine to be fed forwardly, said actuating means comprising meshing gears operated by the rod, and a crank arm connected with one of the gears and engaging the reciprocating twine feeding means for moving said feed upon the actuation of the gears.

2. A machine of the character described, comprising a base, a reciprocating twine feeding means carried thereby, twine guides on said means, a stationary twine grip, a movable twine grip connected with said reciprocating feeding means, a knife at the forward end of the machine, means for holding a strand of twine in the path of said knife, a hand operated rod for actuating said knife to sever the twine, and operating means actuated upon the movement of said rod for reciprocating the twine feeding means to advance the twine forwardly.

3. A machine of the character described, comprising a base, a reciprocating twine feeding means carried thereby, twine guides on said means, a stationary twine grip, a movable twine grip connected with said reciprocating feeding means, a knife at the forward end of the machine, means for holding a strand of twine in the path of said knife, a hand operated rod for actuating said knife to sever the twine, and operating means actuated upon the movement of said rod for reciprocating the twine feeding means to advance the twine forwardly, said operating means comprising meshing gears actuated by a rack on said rod and a crank arm connected with one of said gears for engaging the reciprocating feeding means to move said means forwardly and rearwardly.

4. A machine of the character described, comprising a base, a reciprocating twine feeding means carried thereby, twine guides on said means, a stationary twine grip, a movable twine grip connected with said reciprocating feeding means, a knife at the forward end of the machine, means for holding a strand of twine in the path of said knife, a hand operated rod for actuating said knife to sever the twine, and operating means actuated upon the movement of said rod for reciprocating the twine feeding means to advance the twine forwardly, said operating means comprising meshing gears actuated by a rack on said rod, and a crank arm connected with one of said gears for engaging the reciprocating feeding means to move said means forwardly and rearwardly, and a resilient member for normally urging said rod in a resilient position.

5. A machine of the character described, comprising a base, a reciprocating twine feeding means mounted thereon, a stationary string grip on said base, a movable string grip carried by said reciprocating twine feeding means and through which the string passes, knives mounted at the forward end of the machine, string leads adjacent said knives for receiving a string interposed in the path of movement of the knives, means for operating said knives comprising a cam member and a hand operated rod therefor, and operating means for said twine feeding means actuated upon a movement of said rod to advance the end of the string forwardly after a severing operation.

6. A machine of the character described, comprising a base, a reciprocating twine feeding means mounted thereon, a stationary string grip on said base, a movable string grip carried by said carriage and through which the string passes, knives mounted at the forward end of the machine, string leads adjacent said knives for receiving a string interposed in the path of movement of the knives, means for operating said knives comprising a cam member and a hand operated rod therefor, and operating means for said carriage actuated upon a movement of said rod to advance the end of the string forwardly after a severing operation, said last mentioned means comprising a pair of meshing gears, a rack for operating said gears connected with the hand rod and a crank arm connected with one of the gears and engaging the sliding carriage.

In testimony whereof I affix my signature.

SHIGETARO YAMADA.